(12) United States Patent
Rangaiyengar et al.

(10) Patent No.: US 12,101,256 B1
(45) Date of Patent: Sep. 24, 2024

(54) MANAGING CONNECTIONS IN A MULTI-TENANCY COMPUTING ENVIRONMENT

(71) Applicant: Freshworks Inc., San Mateo, CA (US)

(72) Inventors: Rupashree Heggadadevanakote Rangaiyengar, Chennai (IN); Ramesh Parthasarathy, Chennai (IN); Harif Rahman, Chennai (IN)

(73) Assignee: FRESHWORKS INC., San Mateo, CA (US)

( * ) Notice: Subject to any disclaimer, the term of this patent is extended or adjusted under 35 U.S.C. 154(b) by 0 days.

(21) Appl. No.: 18/136,247

(22) Filed: Apr. 18, 2023

(51) Int. Cl.
| | |
|---|---|
| *H04L 47/10* | (2022.01) |
| *H04L 9/40* | (2022.01) |
| *H04L 47/12* | (2022.01) |
| *H04L 47/24* | (2022.01) |
| *H04L 67/141* | (2022.01) |

(52) U.S. Cl.
CPC ............. *H04L 47/10* (2013.01); *H04L 47/12* (2013.01); *H04L 47/24* (2013.01); *H04L 63/10* (2013.01); *H04L 67/141* (2013.01)

(58) Field of Classification Search
CPC ......... H04L 47/10; H04L 47/12; H04L 47/24; H04L 63/10; H04L 67/141
See application file for complete search history.

(56) References Cited

U.S. PATENT DOCUMENTS

| | | | | |
|---|---|---|---|---|
| 2016/0065418 | A1* | 3/2016 | Barghouthi | ......... H04L 41/5003 709/223 |
| 2018/0046730 | A1* | 2/2018 | De Lavarene | ........ G06F 16/283 |
| 2019/0065278 | A1* | 2/2019 | Jeuk | ....................... G06F 9/5077 |
| 2020/0412825 | A1* | 12/2020 | Siefker | ............... H04L 67/1027 |
| 2021/0067486 | A1* | 3/2021 | Souhrada | ............ H04L 12/4641 |
| 2021/0081427 | A1* | 3/2021 | Obembe | ................ G06F 16/252 |
| 2022/0006858 | A1* | 1/2022 | Obembe | ............... H04L 67/101 |
| 2022/0342718 | A1* | 10/2022 | Iqbal | ...................... H04L 67/63 |

FOREIGN PATENT DOCUMENTS

CN 112751933 B * 5/2023 ........... H04L 67/141

OTHER PUBLICATIONS

Li et al., CN 112751933 B, "Socket connection-based data transmission method (English)", May 5, 2023, p. 13. (Year: 2023).*

* cited by examiner

*Primary Examiner* — Austin J Moreau
*Assistant Examiner* — Chhian (Amy) Ling
(74) *Attorney, Agent, or Firm* — Dinsmore & Shohl LLP (57) ABSTRACT

A method of managing connections to one or more servers in a multi-tenancy computing environment is provided. At a multi-tenancy connection manager responsible for managing connections for multiple tenants of the multi-tenancy computing environment, a plurality of connection pools is configured, each for use by a respective one of the multiple tenants. A connection request is received from a tenant of the multiple tenants. The tenant is identified based on the connection request. Management rules for managing a connection pool that is associated with the identified tenant are obtained. It is determined whether the management rules permit execution of the connection request. In response to a positive determination, the connection request is executed. In response to a negative determination, the connection request is throttled, to preserve and maintain a quality of service provided.

20 Claims, 3 Drawing Sheets

MANAGING CONNECTIONS IN A MULTI-TENANCY COMPUTING ENVIRONMENT

TECHNICAL FIELD

The present disclosure concerns methods of managing connections to one or more servers in a multi-tenancy computing environment. The present disclosure also concerns apparatus and computer program products comprising non-transitory computer-readable storage media having computer-executable instructions which, when executed by a processor, cause a computing device to perform a method of managing connections to one or more servers in a multi-tenancy computing environment.

DESCRIPTION OF THE RELATED TECHNOLOGY

Multi-tenancy is a software architecture wherein a single software application can serve multiple tenants (or 'customers'). Each tenant has a different group of users who share access to the software application. Multi-tenancy is a feature of many different computing environments. In particular, but not exclusively, multi-tenancy is a feature of software-as-a-service (SaaS) computing environments. An example of a SaaS environment is a computing environment implementing a virtual agent. A virtual agent (also referred to as a 'chatbot') may be used to conduct online conversations with users in lieu of providing direct contact with a human agent, and to route requests for the users.

In such computing environments, tenants can request connections to one or more servers, e.g. using Hypertext Transfer Protocol, HTTP, requests. Such connections may comprise connections between one or more application servers and one or more back-end servers. There may be limits, however, to the number of connections which can be maintained at once. This may be due, for example, to a constraint of the destination server, a constraint of the source server, etc. A particular tenant making a large number of requests and/or holding connections for a long time can thus prevent other tenants in the multi-tenancy environment from successfully establishing connections. This may cause the other tenants to get failures, e.g. 5xx errors, when requesting connections, thereby reducing a quality of service experienced by those tenants.

The present disclosure seeks to mitigate the above-mentioned problems. Alternatively or additionally, the present disclosure seeks to provide an improved method of managing connections in a multi-tenancy computing environment.

SUMMARY

A first aspect of the present disclosure relates to a computer-implemented method of managing connections to one or more servers in a multi-tenancy computing environment, the method comprising, at a multi-tenancy connection manager responsible for managing connections for multiple tenants of the multi-tenancy computing environment: configuring a plurality of connection pools, each connection pool of the plurality of connection pools comprising connections to the one or more servers for use by a respective one of the multiple tenants of the multi-tenancy computing environment; receiving, from a tenant of the multiple tenants, a connection request for the one or more servers; identifying the tenant from the multiple tenants based on the connection request; obtaining management rules for managing a connection pool of the plurality of connection pools that is associated with the identified tenant while continuously monitoring the connection pool; determining whether the management rules permit execution of the connection request; in response to a positive determination, executing the connection request; and in response to a negative determination, throttling the connection request, to preserve and maintain a quality of service provided.

A second aspect of the present disclosure relates to a computer program product comprising a non-transitory computer-readable storage medium having computer-readable instructions stored thereon, the computer-readable storage medium being executable by a computerized device to cause the computerized device to perform a method of managing connections to one or more servers in a multi-tenancy computing environment, the method comprising, at a multi-tenancy connection manager responsible for managing connections for multiple tenants of the multi-tenancy computing environment: configuring a plurality of connection pools, each connection pool of the plurality of connection pools comprising connections to the one or more servers for use by a respective one of the multiple tenants of the multi-tenancy computing environment; receiving, from a tenant of the multiple tenants, a connection request for the one or more servers; identifying the tenant from the multiple tenants based on the connection request; obtaining management rules for managing a connection pool of the plurality of connection pools that is associated with the identified tenant while continuously monitoring the connection pool; determining whether the management rules permit execution of the connection request; in response to a positive determination, executing the connection request; and in response to a negative determination, throttling the connection request, to preserve and maintain a quality of service provided.

A third aspect of the present disclosure relates to an apparatus comprising: at least one processor; and at least one memory including computer program code, wherein the at least one memory and the computer program code are configured to, with the at least one processor, cause the apparatus to: at a multi-tenancy connection manager responsible for managing connections for multiple tenants of the multi-tenancy computing environment: configure a plurality of connection pools, each connection pool of the plurality of connection pools comprising connections to the one or more servers for use by a respective one of the multiple tenants of the multi-tenancy computing environment; receive, from a tenant of the multiple tenants, a connection request for the one or more servers; identify the tenant from the multiple tenants based on the connection request; obtain management rules for managing a connection pool of the plurality of connection pools that is associated with the identified tenant while continuously monitoring the connection pool; determine whether the management rules permit execution of the connection request; in response to a positive determination, execute the connection request; and in response to a negative determination, throttle the connection request, to preserve and maintain a quality of service provided.

A fourth aspect of the present disclosure relates to a computer-implemented method of managing connections to one or more servers, the method comprising: at a tenant-aware connection manager responsible for managing connections for multiple tenants of a multi-tenancy software-as-a-service, SaaS, computing environment: establishing a plurality of connection pools, each connection pool of the plurality of connection pools being associated with a respective one of the multiple tenants of the multi-tenancy SaaS computing environment and comprising connections, to one or more servers, that are reserved for use by the respective one of the multiple tenants; receiving, from a tenant of the multiple tenants, a request for one or more connections to the one or more servers; identifying, based on the request, a connection pool from the plurality of connection pools that is associated with the tenant; obtaining management rules for managing the identified connection pool; determining whether the management rules permit execution of the request; in response to a positive determination, executing the request; and in response to a negative determination, throttling the request.

A fifth aspect of the present disclosure relates to a computer program product comprising a non-transitory computer-readable storage medium having computer-readable instructions stored thereon, the computer-readable storage medium being executable by a computerized device to cause the computerized device to perform a method of managing connections to one or more servers, the method comprising: at a tenant-aware connection manager responsible for managing connections for multiple tenants of a multi-tenancy software-as-a-service, SaaS, computing environment: establishing a plurality of connection pools, each connection pool of the plurality of connection pools being associated with a respective one of the multiple tenants of the multi-tenancy SaaS computing environment and comprising connections, to one or more servers, that are reserved for use by the respective one of the multiple tenants; receiving, from a tenant of the multiple tenants, a request for one or more connections to the one or more servers; identifying, based on the request, a connection pool from the plurality of connection pools that is associated with the tenant; obtaining management rules for managing the identified connection pool; determining whether the management rules permit execution of the request; in response to a positive determination, executing the request; and in response to a negative determination, throttling the request.

A sixth aspect of the present disclosure relates to an apparatus comprising: at least one processor; and at least one memory including computer program code, wherein the at least one memory and the computer program code are configured to, with the at least one processor, cause the apparatus to: at a tenant-aware connection manager responsible for managing connections for multiple tenants of a multi-tenancy software-as-a-service, SaaS, computing environment: establish a plurality of connection pools, each connection pool of the plurality of connection pools being associated with a respective one of the multiple tenants of the multi-tenancy SaaS computing environment and comprising connections, to one or more servers, that are reserved for use by the respective one of the multiple tenants; receive, from a tenant of the multiple tenants, a request for one or more connections to the one or more servers; identify, based on the request, a connection pool from the plurality of connection pools that is associated with the tenant; obtain management rules for managing the identified connection pool; determine whether the management rules permit execution of the request; in response to a positive determination, execute the request; and in response to a negative determination, throttle the request.

It will of course be appreciated that features described in relation to one aspect of the present disclosure may be incorporated into other aspects of the present disclosure. For example, the method of the present disclosure may incorporate any of the features described with reference to the apparatus of the present disclosure and vice versa.

DETAILED DESCRIPTION OF CERTAIN INVENTIVE EMBODIMENTS

Figure 1:
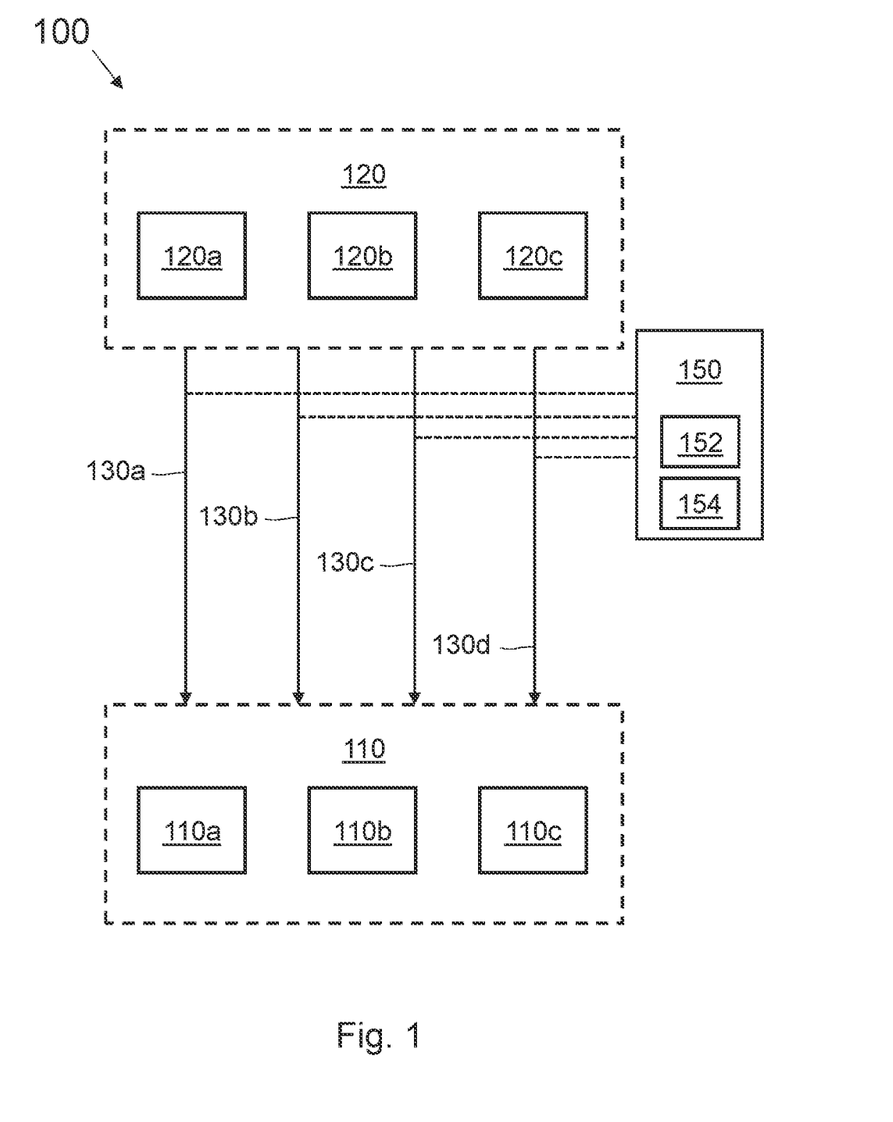
FIG. 1 shows a schematic block diagram of a multi-tenancy computing environment according to embodiments of the present disclosure.

FIG. 1 shows schematically a multi-tenancy computing environment 100 according to embodiments of the present disclosure. The multi-tenancy computing environment 100 is a computing environment in which multiple tenants (not shown) share access to resources. In embodiments, the multi-tenancy computing environment 100 comprises a multi-tenancy SaaS computing environment.

The multi-tenancy computing environment 100 comprises one or more servers 110. While in the example shown in FIG. 1 the one or more servers 110 comprise three servers 110a, 110, 110b, it will be understood that the one or more servers 110 may comprise any number of servers, including a single server. In embodiments, the one or more servers 110 comprise back-end servers. In embodiments, the one or more servers 110 are configured to implement a database. In embodiments, the one or more servers 110 comprise physical servers. In alternative embodiments, the one or more servers 110 comprise virtualized servers, e.g. where the computing environment 100 comprises a virtualized computing environment.

In the embodiments of FIG. 1, the multi-tenancy computing environment 100 comprises one or more application servers 120. While in the example shown in Figure the one or more application servers 120 comprise three application servers 120a, 120b, 120c, it will be understood that the one or more application servers 120 may comprise any number of application servers, including a single application server. In embodiments, the one or more application servers 120 comprise physical servers. In alternative embodiments, the one or more application servers 120 comprise virtualized application servers.

The multi-tenancy computing environment 100 comprises a multi-tenancy connection manager 150. The multi-tenancy connection manager 150 may be referred to as a 'tenant-aware connection manager'. The multi-tenancy connection manager 150 is responsible for managing connections for multiple tenants of the multi-tenancy computing environment 100. The multi-tenancy connection manager 150 may comprise one or more components. The one or more components may be implemented in hardware and/or software. The one or more components may be co-located or may be located remotely from each other. The multi-tenancy connection manager 150 may be embodied as one or more software functions and/or hardware modules. For example, the multi-tenancy connection manager 150 may be embodied as one or more software threads running on a server. In embodiments, the multi-tenancy connection manager 150 comprises one or more processors 152 configured to process instructions and/or data. Operations performed by the one or more processors 152 may be carried out by hardware and/or software. In embodiments, the multi-tenancy connection manager 150 comprises at least one memory 154. The at least one memory 154 may comprise at least one volatile memory, at least one non-volatile memory, and/or at least one data storage unit. The volatile memory, non-volatile memory and/or data storage unit may be configured to store computer-readable information and/or instructions for use by one or more processors 152. While in the example shown in FIG. 1 the multi-tenancy connection manager 150 is shown as a separate entity relative to the one or more application servers 120, in some embodiments the multi-tenancy connection manager 150 is comprised in (e.g. running on) the one or more application servers 120.

As mentioned above, the multi-tenancy computing environment 100 may comprise a virtualized environment in some embodiments, and the one or more servers 110 and/or the one or more application servers 120 may comprise virtualized servers. In such embodiments, the one or more servers 110 and/or the one or more application servers 120 may be instantiated (or 'spun-up') by the multi-tenancy connection manager 150, or by another supervisor or orchestration entity (not shown).

In embodiments, a plurality of connection pools 130a, 130b, 130c, 130d is provided. Each connection pool of the plurality of connection pools 130a, 130b, 130c, 130d comprises connections to the one or more servers 110 for use by a respective one of the multiple tenants of the multi-tenancy computing environment 100. As such, the multiple tenants of the multi-tenancy computing environment 100 do not share a common connection pool, but instead each tenant is provided with its own individual connection pool. A connection pool is a group of connections to the one or more servers 110 that are maintained rather than released, so that the connections can be re-used by the respective tenant when required, rather than new connections having to be established whenever the tenant needs them. The use of connection pools reduces overheads associated with establishing new connections, thereby improving efficiency. Although four connection pools are shown in the example of FIG. 1, it will be understood that the plurality of connection pools may comprise other numbers of connection pools. The number of connection pools may be the same as the number of tenants of the multi-tenancy computing environment 100. That is, each tenant has use of a respective connection pool.

In embodiments, the connections in each of the connection pools 130a, 130b, 130c, 130d are between the one or more application servers 120 and the one or more servers 110. In alternative embodiments, the connections to the one or more servers 110 do not originate from the one or more application servers 120. For example, the connections may originate from any entity hosting a remote application programming interface, API, call to the one or more servers 110. As such, the one or more application servers 120 may be omitted from the computing environment 100 in some embodiments.

The plurality of connection pools 130a, 130b, 130c, 130d are managed by the multi-tenancy connection manager 150, as will be described in more detail below. In embodiments, the multi-tenancy connection manager 150 is also configured to monitor each of the plurality of connection pools 130a, 130b, 130c, 130d. The multi-tenancy connection manager 150 thus oversees (or supervises) the plurality of connection pools 130a, 130b, 130c, 130d.

By providing each tenant of the multi-tenancy computing environment 100 with its own connection pool, and configuring a multi-tenancy connection manager 150 to manage and monitor all of the connection pools, a quality of service provided to the tenants (and consequently to the respective users of each tenant) may be improved and/or maintained. In particular, an errant tenant making bulk requests has a reduced impact on the service provided to other tenants, because each tenant has its own separate connection pool.

Multi-tenancy is a feature of some known SaaS applications. However, such known applications do not include tenant-aware connection management strategies. Tenancy management and monitoring is typically left to developer discretion, e.g. using ad hoc workarounds rather than a robust platform construct. This can lead to unmanageable application logic, making bugs hard to detect, particularly when the application is scaled up. Debugging such applications to fix connection management issues may be time consuming, e.g. due to the intricate nature of 5xx issues encountered. For example, HTTP requests may be executed using HttpClient. In known commercial implementations of HttpClient, there are no restrictions on request execution, and the specifics of connection management are left to the discretion of individual developers. The methods and systems of the present disclosure provide a framework construct embedding tenancy awareness and tenancy monitoring with connection pools, to improve and maintain a quality of service of the SaaS. This enables more robust application development and more efficient troubleshooting in case of failures.

Known connection pool implementations focus on scaling single large connection pools based on burst traffic. The single connection pool may be scaled up or down based on the current load or based on a specified pool re-balancing factor. Such a single connection pool is shared across all users making requests, and there is no concept of tenancy or tenancy awareness. This strategy can cause application degradation due to burst traffic, as well as latency in serving connection requests. Moreover, as discussed above, a particular tenant making bulk requests and/or holding connections for a long time can cause other users to get repeated failures, since a single connection pool is being shared across all users. The use of individual connection pools for each tenant addresses this issue, e.g. by allowing dynamic scaling of individual connection pools rather than a single, shared connection pool.

The methods and systems of the present disclosure enable a service to be provided to multiple tenants according to the specific requirements of each tenant. For example, for a first tenant an application may need to make up to n connections, whereas for a second tenant the application may need to make up to p connections, where p is unrelated to n. For a third tenant, the application may need to make a fixed number of connections, e.g. 100 connections to 10 servers. As such, different tenants may have different requirements to be met. The specific requirements of a given destination may also be taken into account. For example, for a given destination (e.g. comprising one or more back-end servers) the application may only allow up to k connections, regardless of which tenant is making requests. Each of these requirements (or others) may be taken into account by the multi-tenancy connection manager of the present disclosure when managing connections for the multi-tenancy computing environment.

Figure 2:
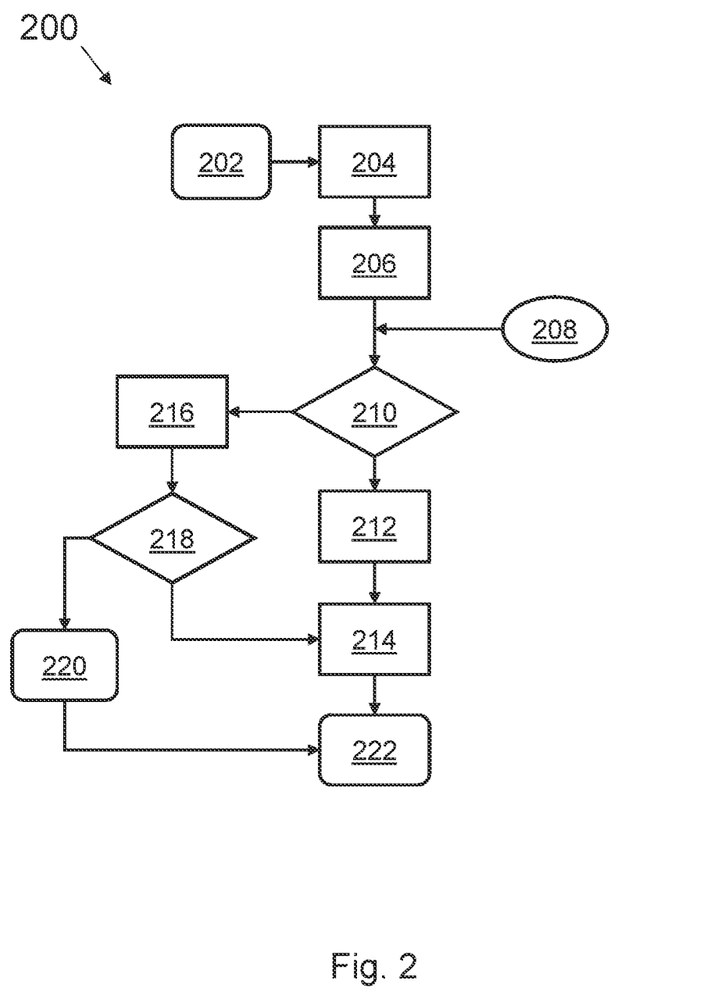
FIG. 2 shows a flow diagram illustrating a method of managing connections in a multi-tenancy software-as-a-service, SaaS, computing environment, according to embodiments of the present disclosure.

FIG. 2 shows a flow diagram illustrating a method 200 for managing connections to one or more servers in a multi-tenancy SaaS computing environment, according to embodiments of the present disclosure.

The method 200 starts at item 202, in which a SaaS application is deployed, e.g. on one or more application servers.

At item 204, a tenancy-aware driver is initialized. This step may be performed by an application developer, for example. The tenancy-aware driver may be referred to as a 'SAASTenancyAwareDriver'. The tenancy-aware driver is to be used for one or more of the subsequent steps of the method 200. Initializing the tenancy-aware driver may comprise instantiating a software instance. For example, the tenancy-aware driver may be initialized using the command:

SAASTenancyAwareDriver
driver=SAASTenancyAwareDriver.getInstance( ).

At item 206, a tenancy-aware connection manager (also referred to as a 'SAASTenantAwarePoolManager') is initialized, e.g. instantiated. The tenancy-aware connection manager is initialized using the tenancy-aware driver. The tenancy-aware connection manager may be implemented at least in part as a 'Sophisticated Look Up for the Pool Implementation', SOPOI, algorithm. In embodiments, the tenancy-aware connection manager is instantiated using the following command:

SAASTenantAwarePoolManager
cm=driver.getTenantAwareConnectionManager( ).

The tenancy-aware connection manager initializes a common connection pool configuration properties register (also referred to as a 'DefaultSAASContext'). The common connection pool configuration properties register is used to store the configuration properties of each connection pool. In embodiments, the DefaultSAASContext contains a map for which the key is a tenant identifier of a tenant and the value is the handle to the connection pool of the tenant. In embodiments, the DefaultSAASContext is used by the tenancy-aware connection manager to establish and/or configure connection pools for tenants, as will be described below. In embodiments, the DefaultSAASContext is defined as:

Class DefaultSAASContext {
    Map<String, SAASContext>defaultSAASContext=new HashMap< >( ); }.

In embodiments, the DefaultSAASContext is associated with one or more default configuration properties (referred to as a 'DefaultConnectionConfiguration') which may be used to configure a connection pool. In embodiments, the DefaultConnectionConfiguration object is defined as:

Class DefaultConnectionConfiguration {
    Integer minConnections=3;
    Integer maxConnections=20;
    double max Threshold=0.75; }.

It will be understood that the above values and/or fields are illustrative and that other values and/or fields for the default configuration properties may be used in other embodiments. The minConnections field defines a minimum number of connections in a connection pool. The maxConnections field defines a maximum number of connections in a connection pool. The maxThreshold field defines a threshold parameter at which the size of the connection pool is increased, e.g. doubled.

In embodiments, the SAASContext object (mentioned in the DefaultSAASContext object described above) is defined as:

Class SAASContext {
    ConnectionManager cManager;
    ConnectionMonitor cMonitor;
    SourceConfiguration sourceConfiguration;
    DestinationConfiguration destinationConfiguration; }.

In embodiments, the ConnectionManager object contains a handle to the connection pool for a given tenant. In embodiments, the ConnectionMonitor object contains one or more of the following fields:

Class ConnectionMonitor {
    ConnectionPoolStatus pool Status;
    Long freeConnectionCount;
    Long waitConnectionCount;
    Long blockedConnectionCount;
    Long inUseConnectionCount;
    Long inUseTime;
    Long waitTime;
    Long blockedTime;
    Long createdConnectionCount;
    Boolean poolRestart;
    Boolean poolExpand; }.

The ConnectionPoolStatus field indicates a status of a given connection pool associated with a given tenant. For example, the status may be one of 'running, 'suspended', 'stopped', 'unhealthy', or 'unknown'. The freeConnectionCount field indicates a number of free connections in the connection pool. The waitConnectionCount field indicates a number of connections in the connection pool that are in a wait state. The blockedConnectionCount field indicates a number of connections in the connection pool that are in a blocked state. The inUseConnectionCount field indicates a number of connections in the connection pool that are in an in-use state. The inUseTime field indicates an average time that a connection in the connection pool is in use. The waitTime field indicates an average time that a connection in the connection pool is in the wait state. The blockedTime field indicates an average time that a connection in the connection pool is in the blocked state. The createdConnectionCount field comprises a counter indicating the number of connections that have been created for the given tenant. The poolRestart flag indicates that the connection pool should be restarted. The poolExpand flag indicates that the connection pool should be expanded. The ConnectionMonitor object may contain more, fewer or different fields in other embodiments.

In embodiments, the SourceConfiguration object indicates one or more configuration properties of a connection pool that a tenant has requested. The tenant may request such configuration properties in a connection request, for example. In embodiments, the SourceConfiguration object contains the following fields:

Class SourceConfiguration {
    Long maxPoolSize;
    Long minPoolSize;
    Long defaultPoolSize;
    double threshold; }.

The maxPoolSize field is used to indicate a maximum size of the connection pool for the tenant. The minPoolSize field is used to indicate a minimum size of the connection pool. The defaultPoolSize field indicates a default (or initial) size of the connection pool. The threshold field is used to indicate a threshold at which the size of the connection pool is to be increased. The SourceConfiguration object may contain more, fewer and/or different fields in other embodiments.

In embodiments, the DestinationConfiguration object indicates one or more configuration properties of the destination server(s). In embodiments, the DestinationConfiguration object is defined as:
Class DestinationConfiguration {
 Configuration defaultConfiguration;
 Map<String, Configuration>configMap=new HashMap< >( ); }.

In embodiments, the Configuration object indicates one or more system requirements. The system requirements may comprise requirements or constraints of the service provider providing the SaaS to the tenants, for example. In embodiments, such system requirements comprise requirements or constraints of one or more application servers in the multi-tenancy SaaS computing environment. In embodiments, the Configuration object includes the following fields:
Class Configuration {
 Long maxConnections;
 Long minConnections;
 Long inUseConnections;
 Long failedConnections;
 double threshold; }

The maxConnections field is used to indicate a maximum number of connections for the system. The minConnections field is used to indicate a minimum number of connections for the system. The inUseConnections field is used to indicate a number of connections that are in an in-use state. The failedConnections field is used to indicate a number of failed connections.

In embodiments, a background monitoring thread, BACMON, for monitoring connection pools is also initiated. In embodiments, the background monitoring thread is part of (e.g. implemented by) the tenancy-aware connection manager. In alternative embodiments, the background monitoring thread is separate from the tenancy-aware connection manager. As such, the initializing of the tenancy-aware connection manager (at item 206) and the initiating of the background monitoring thread may comprise separate method steps. The background monitoring thread is a thread that monitors all of the connection pools using the DefaultSAASContext. In embodiments, the background monitoring thread is configured to update the status and/or configuration properties of the connection pools and to perform housekeeping for the connection pools. For example, if the poolExpand flag is set, the thread is configured to increase the size of the connection pool, e.g. up to a predetermined maximum pool size. Similarly, if the poolRestart flag is set, the thread is configured to restart and/or re-initialize the connection pool. In embodiments, the background monitoring thread is configured to run periodically. In embodiments, the background monitoring thread is configured to run continuously. In embodiments, the background monitoring thread is configurable as a cron pattern or other job scheduler.

At item 208, a connection request is received. The connection request is received from a tenant of multiple tenants of the multi-tenancy SaaS computing environment. The connection request comprises a request for one or more connections to one or more servers for use by the tenant. The tenant sending the connection request may be a tenant that already has a connection pool for connecting to the one or more servers, or may be a new tenant that does not have an existing connection pool. In embodiments, the connection request comprises a Hypertext Transfer Protocol, HTTP, request. In alternative embodiments, the connection request comprises a request using a different protocol. In embodiments, when the connection request is received by the application, it is intercepted by the SOPOI, which implements a sophisticated look-up strategy for the SAAS tenant-aware client. In embodiments, the connection request contains tenant-specific configuration parameters for a connection pool. Such configuration parameters may be used to populate the SourceConfiguration object described above, for example.

In embodiments, the connection request comprises, or is usable to derive, a tenant identifier. In embodiments, the tenant identifier comprises an alphanumeric key which is generated using a combination of the tenant name and the internet protocol, IP, address of the tenant. This function is able to uniquely differentiate and resolve to the same tenant every time a connection request is received from that tenant. For example, the tenant identifier may be defined by:
 String tenantid=SaasTenantAwareHash(tenant-name, tenant-ip).

In embodiments, the tenant identifier is an alphanumeric universally unique identifier, UUID, that uniquely identifies a particular tenant and the tenant's IP address, and may be used to set up a connection pool for all the requests that are received from that tenant.

At item 210, it is determined whether the tenant already has an associated connection pool. The determining may be performed on the basis of the tenant identifier, for example. In embodiments, the determining comprises checking the DefaultSAASContext for the presence of the tenant identifier. That is, if the DefaultSAASContext does not include the tenant identifier, then it may be inferred that the tenant does not already have an associated connection pool, and the tenant thus requires onboarding.

In response to a negative determination at item 210, a connection pool for the tenant is established at item 212. In embodiments, establishing the connection pool for the tenant comprises building a SAASContext for the tenant. The SAASContext contains configuration information for the connection pool of the tenant. The SAASContext may be built using the following commands:
ConnectionConfiguration configuration=parseInputForConnectionConfiguration(request);
ConnectionMonitor monitor=initializeConnectionMonitoring( );
ConnectionManager manager=setUpConnectionPools( );
SAASContext saasContext=SAASContext.initialize(manager, monitor, configuration).

In embodiments, at least some of the configuration information for the connection pool is specified by the tenant, e.g. in the received connection request. The connection request may be parsed for such configuration information. For example, if the tenant wishes to make 100 connections to destination IP 'AA' and 500 connections to destination IP 'BB', then the configuration object can insert the rules within the configMap as follows:
configMap.put(AA, new Configuration(1, 100, 0.75);
configMap.put(BB, new Configuration (1, 500, 0.75).

In alternative embodiments, e.g. if no detailed values are provided by the tenant, the configuration object may be populated with default values. The defaultConnectionConfiguration object (see above) in the ConnectionConfiguration object can be configured to manage a use-case where the tenant requires at most 100 connections for any destination, for example.

In embodiments, establishing the connection pool for the tenant comprises updating the DefaultSAASContext object. As discussed above, the DefaultSAASContext object acts as a common register storing configuration information for all of the established connection pools. Updating the Default-SAASContext object may comprise the following command:

If (! defaultSAASContext.containsKey(tenantid))
    defaultSAASContext.put(tenantid, saasContext).

As such, the common register is updated to include the specific configuration parameters of the newly established connection pool, as well as the tenant identifier of the tenant associated with the connection pool.

At item 214, the connection request is executed.

In response to a positive determination at item 210, connection pool information for the existing connection pool associated with the tenant is retrieved at item 216. The connection pool information may be retrieved from the DefaultSAASContext (i.e. the common register) or from the SAASContext for the specific tenant, for example. The connection pool information comprises management rules for managing the connection pool. In embodiments, the connection pool information comprises configuration properties of the connection pool.

At item 218, it is determined whether the management rules for managing the connection pool permit execution of the connection request. For example, it is determined whether executing the connection request would break any of the management rules. In embodiments, the management rules overall may permit execution of the connection request even if one or more of the management rules individually would be broken by execution of the connection request. In alternative embodiments, the management rules permit execution of the connection request only if none of the individual management rules would be broken.

In response to determining, at item 218, that the management rules permit execution of the connection request, the connection request is executed at item 214. For example, the requested number of connections are established and/or allocated for use by the tenant. In embodiments, one or more configuration properties of the connection pool are updated based on the execution of the connection request. For example, an inUseConnectionCount is incremented, a freeConnectionCount is decremented, etc. In embodiments, one or more configuration properties of the destination servers are updated based on the execution of the connection request. For example, an inUseConnections is incremented.

In response to determining, at item 218, that the management rules do not permit execution of the connection request, the connection request is throttled at item 220. In embodiments, throttling the connection request comprises not executing the connection request. In embodiments where the connection request indicates that a plurality of connections is requested, throttling the connection request may comprise allowing some of the plurality of connections to be established and/or maintained and not allowing others of the plurality of connections to be established and/or maintained. As such, throttling the connection request may involve refusing (or blocking) some or all of the requested connections.

The method 200 ends at item 222.

Figure 3:
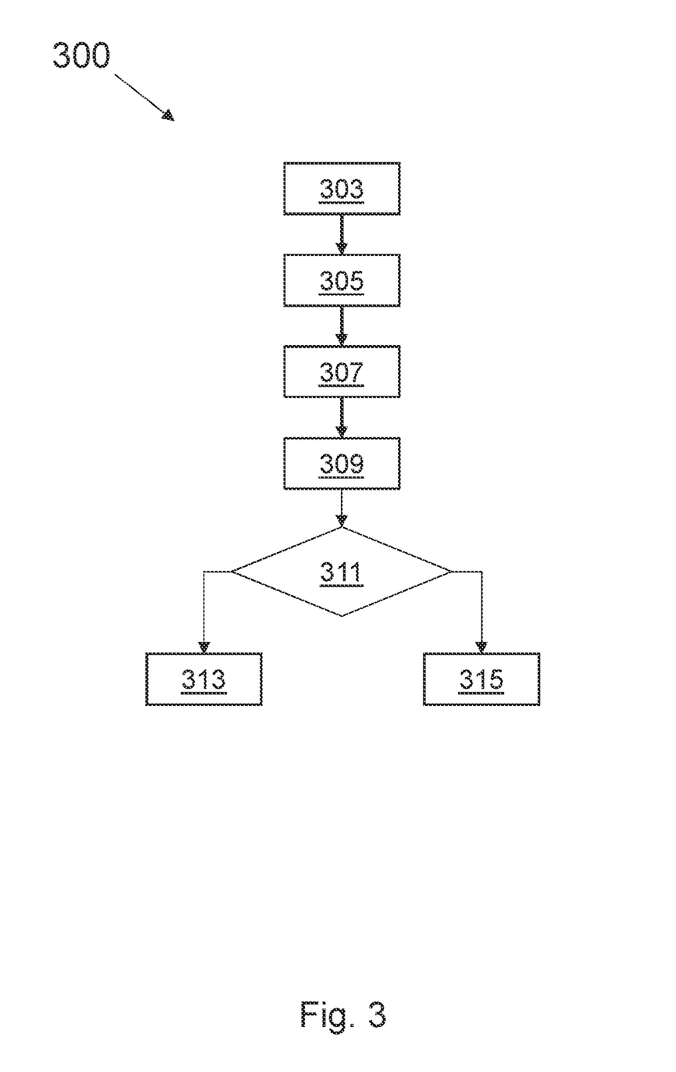
FIG. 3 shows a flow diagram illustrating a method of managing connections in a multi-tenancy computing environment, according to embodiments of the present disclosure.

FIG. 3 shows a flow chart illustrating a method 300 of managing connections to one or more servers in a multi-tenancy computing environment, according to embodiments of the present disclosure. The method is performed at a multi-tenancy connection manager responsible for managing connections for multiple tenants of the multi-tenancy computing environment. In embodiments, the multi-tenancy computing environment comprises a SaaS computing environment. In embodiments, the SaaS computing environment is configured to implement a virtual agent.

At item 303, a plurality of connection pools is configured. Each connection pool of the plurality of connection pools comprises connections to the one or more servers for use by a respective one of the multiple tenants of the multi-tenancy computing environment. In embodiments, configuring a connection pool comprises establishing a connection pool, e.g. establishing a plurality of connections to the one or more servers that are designated for use by the tenant.

At item 305, a connection request for the one or more servers is received from a tenant of the multiple tenants.

At item 307, the tenant is identified from the multiple tenants based on the connection request.

At item 309, management rules are obtained. The management rules are for managing a connection pool of the plurality of connection pools that is associated with the identified tenant. In embodiments, the management rules are for managing the connection pool while continuously monitoring the connection pool.

In embodiments, the management rules comprise a constraint on the connection pool associated with the identified tenant. In embodiments, the constraint comprises a maximum size of the connection pool associated with the identified tenant. That is, the constraint may comprise a maximum number of connections that the connection pool is permitted to have. In embodiments, the constraint comprises a minimum size of the connection pool.

In embodiments, one or more of the obtained management rules are dependent on information received from the identified tenant. For example, information indicating one or more of the obtained management rules may be included in the connection request from the tenant, or from a previous connection request from the tenant.

In embodiments, the management rules comprise a constraint on the one or more servers. In embodiments, the constraint comprises a maximum number of connections to the one or more servers. In embodiments, the constraint comprises a minimum number of connections to the one or more servers.

In embodiments, the one or more servers comprise one or more back-end servers. In some such embodiments, the connection pool of the identified tenant comprises connections between one or more application servers and the one or more back-end servers. In embodiments, the management rules comprise a constraint on the one or more application servers. That is, the management rules may comprise a constraint on the service provider that is providing the multi-tenancy SaaS for the multiple tenants. In embodiments, the constraint comprises a maximum number of connections from the one or more application servers. In alternative embodiments, the connections are not between application servers and back-end servers. For example, the methods described herein may be applied to any application executing a TCP-based remote application programming interface, API, call.

As such, the management rules may comprise constraints on one or more of: the connection pool of the tenant, the destination server(s), and the service provider. In alternative embodiments, the management rules for a connection pool of a first tenant comprise a constraint on a connection pool of a second tenant.

At item 311, it is determined whether the management rules permit execution of the connection request. For example, it may be determined whether execution of the connection request would break any one of the management rules.

In response to a positive determination at item 311, the connection request is executed at item 313. Executing the connection request may comprise establishing and/or maintaining one or more connections for the tenant as specified by the connection request.

In response to a negative determination at item 311, the connection request is throttled at item 315, to preserve and maintain a quality of service provided.

In embodiments, the identified tenant is a first tenant of the multiple tenants, and the obtained management rules comprise first management rules. In some such embodiments, the method 300 comprises a step (not shown) at the multi-tenancy connection manager, comprising obtaining second management rules for managing a connection pool of the plurality of connection pools that is associated with a second tenant of the multiple tenants. The second management rules are at least partially different from the first management rules. In embodiments, the method 300 comprises a step (not shown) at the multi-tenancy connection manager, comprising managing connections for the second tenant in accordance with the second management rules. Accordingly, different connection pools of the plurality of connection pools may be managed using rules that are at least partially different. For example, a connection pool for a first tenant may have a first maximum pool size, whereas a connection pool for a second tenant may have a second, different maximum pool size. The multi-tenancy computing environment may thus be flexibly adapted to suit different needs and/or priorities of different tenants.

In embodiments, configuring the plurality of connection pools comprises obtaining, for each connection pool of the plurality of connection pools, one or more configuration properties of the connection pool. In some such embodiments, the method 300 comprises a step (not shown), at the multi-tenancy connection manager, comprising storing the one or more configuration properties of each connection pool of the plurality of connection pools in a common connection pool configuration properties register. This allows the multi-tenancy connection manager to oversee and monitor all of the connection pools. As such, the multi-tenancy connection manager can detect if a particular tenant is behaving problematically, e.g. making bulk requests or maintaining connections for a relatively long time. In embodiments, the common connection pool configuration properties register is dynamically updated when changes to the configuration properties of any of the connection pools occur. In embodiments, the common connection pool configuration properties register is dynamically updated when a new connection pool (e.g. for a new tenant) is established.

In embodiments, the one or more configuration properties comprise, for each connection pool, one or more of: a number of connections in the connection pool, a number of free connections in the connection pool, a number of connections in the connection pool that are in a wait state, a number of connections in the connection pool that are in a blocked state, a number of connections in the connection pool that are in use, an average time that a connection in the connection pool is in use, an average time that a connection in the connection pool is in the wait state, an average time that a connection in the connection pool is in the blocked state, a maximum number of connections in the connection pool, and a minimum number of connections in the connection pool.

In embodiments, the method 300 comprises a step (not shown), at the multi-tenancy connection manager, comprising modifying the one or more configuration properties of the connection pool that is associated with the identified tenant based on a result of the determining. For example, if it is determined that execution of the connection request is permitted by the management rules, the number of connections that are in use may be incremented, and/or the number of free connections may be decremented. This facilitates accurate monitoring of the connection pool over time.

In embodiments, obtaining the one or more configuration properties for a given connection pool of the plurality of connection pools comprises assigning default configuration properties to the given connection pool. This allows the connection pool to be configured for the respective tenant even if the tenant does not itself indicate desired configuration properties of the connection pool.

In embodiments, obtaining the one or more configuration properties for a given connection pool of the plurality of connection pools comprises receiving an indication of a desired configuration property from a tenant associated with the given connection pool. As such, the tenant can request particular configuration properties of its connection pool, e.g. to suit its needs. Such desired configuration properties may comprise a desired maximum and/or minimum size of the connection pool, for example. In embodiments, the indication of the desired configuration property is included in the connection request received at item 305. This may be more efficient than sending desired configuration properties in separate messages and/or requests.

In embodiments, the method 300 comprises a step (not shown), at the multi-tenancy connection manager, comprising determining a number of connections in the connection pool of the identified tenant that are in use. In some such embodiments, the method 300 comprises a step (not shown), at the multi-tenancy connection manager, comprising expanding the connection pool of the identified tenant in response to the determined number of connections that are in use exceeding a predetermined threshold. Expanding the connection pool comprises increasing the number of connections in the connection pool. For example, the connection pool may be expanded in response to determining that more than 75% of the connections in the connection pool are in use. This provides additional flexibility to the tenant, allowing for scenarios in which an amount of traffic for that tenant has increased. In embodiments, it is determined whether one or more management rules permit expanding the connection pool, and the connection pool is expanded only if it is determined that the one or more management rules permit such expansion. The one or more management rules may comprise a constraint on the total number of connections across all connection pools, for example. In embodiments, the one or more management rules comprise a constraint on the maximum possible connection pool size that is permitted for any tenant. This can reduce and/or prevent failures otherwise experienced by other tenants due to the expansion of a given tenant's connection pool. In embodiments, a connection pool is shrunk (i.e. the number of connections in the connection pool is reduced) in response to determining that the number of connections that are in use is below a predetermined threshold.

In embodiments, the method 300 comprises a step (not shown), at the multi-tenancy connection manager, comprising determining a number of connections in the connection pool of the identified tenant that are in a blocked state. In some such embodiments, the method 300 comprises a step (not shown), at the multi-tenancy connection manager, comprising re-initializing the connection pool of the identified tenant in response to the determined number of connections that are in the blocked state exceeding a predetermined threshold. For example, the connection pool may be re-initialized if it is determined that at least 95% of the connections in the connection pool are in the blocked state.

This reduces the likelihood of the tenant experiencing repeated failures due to the blocked connections.

Whilst the present disclosure has been described and illustrated with reference to particular embodiments, it will be appreciated by those of ordinary skill in the art that the present disclosure lends itself to many different variations not specifically illustrated herein.

One or more aspects of the embodiments described herein comprise processes performed by apparatus. In some examples, the apparatus comprises one or more processors configured to carry out these processes. In this regard, embodiments may be implemented at least in part by computer software stored in (non-transitory) memory and executable by the processor, or by hardware, or by a combination of tangibly stored software and hardware (and tangibly stored firmware). Embodiments also include computer programs, particularly computer programs on or in a carrier, adapted for putting the above-described embodiments into practice. The program may be in the form of non-transitory source code, object code, or in any other non-transitory form suitable for use in the implementation of processes according to embodiments. The carrier may be any entity or device capable of carrying the program, such as a RAM, a ROM, or an optical memory device, etc.

The one or more processors may comprise a central processing unit (CPU). The one or more processors may comprise a graphics processing unit (GPU). The one or more processors may comprise one or more of a field programmable gate array (FPGA), a programmable logic device (PLD), or a complex programmable logic device (CPLD). The one or more processors may comprise an application specific integrated circuit (ASIC). It will be appreciated by the skilled person that many other types of device, in addition to the examples provided, may be used to provide the one or more processors. The one or more processors may comprise multiple co-located processors or multiple disparately located processors. Operations performed by the one or more processors may be carried out by one or more of hardware, firmware, and software.

The one or more processors may comprise data storage. The data storage may comprise one or both of volatile and non-volatile memory. The data storage may comprise one or more of random access memory (RAM), read-only memory (ROM), a magnetic or optical disk and disk drive, or a solid-state drive (SSD). It will be appreciated by the skilled person that many other types of memory, in addition to the examples provided, may also be used. It will be appreciated by a person skilled in the art that the one or more processors may each comprise more, fewer and/or different components from those described.

The techniques described herein may be implemented in software or hardware, or may be implemented using a combination of software and hardware. They may include configuring an apparatus to carry out and/or support any or all of techniques described herein. Although at least some aspects of the examples described herein with reference to the drawings comprise computer processes performed in processing systems or processors, examples described herein also extend to computer programs, for example computer programs on or in a carrier, adapted for putting the examples into practice. The carrier may be any entity or device capable of carrying the program. The carrier may comprise a computer readable storage media. Examples of tangible computer-readable storage media include, but are not limited to, an optical medium (e.g., CD-ROM, DVD-ROM or Blu-ray), flash memory card, floppy or hard disk or any other medium capable of storing computer-readable instructions such as firmware or microcode in at least one ROM or RAM or Programmable ROM (PROM) chips.

Where in the foregoing description, integers or elements are mentioned which have known, obvious or foreseeable equivalents, then such equivalents are herein incorporated as if individually set forth. Reference should be made to the claims for determining the true scope of the present disclosure, which should be construed so as to encompass any such equivalents. It will also be appreciated by the reader that integers or features of the present disclosure that are described as preferable, advantageous, convenient or the like are optional and do not limit the scope of the independent claims. Moreover, it is to be understood that such optional integers or features, whilst of possible benefit in some embodiments of the present disclosure, may not be desirable, and may therefore be absent, in other embodiments.

What is claimed is:

1. A computer-implemented method of managing connections to ene a plurality of servers in a multi-tenancy computing environment, comprising:
    at a multi-tenancy connection manager responsible for managing connections for multiple tenants of the multi-tenancy computing environment:
        configuring a plurality of connection pools, wherein:
            each connection pool of the plurality of connection pools is configured for use by a single tenant of the multiple tenants of the multi-tenancy computing environment;
            each connection pool of the plurality of connection pools comprises connections to the plurality of servers for use by the single tenant,
            each connection of the plurality of connection pools is configured with one or more configuration properties based on one or more connection requirements of the single tenant associated with each connection pool, and
            the one or more configuration properties comprise at least one of:
                a minimum number of connections to two or more servers of the plurality of servers required for the single tenant in the connection pool; or
                a maximum number of connections to the two or more servers of the plurality of serves permitted for the single tenant in the connection pool;
        storing the one or more configuration properties of each connection pool of the plurality of connection pools in a common connection pool configuration properties register;
        receiving, from a tenant of the multiple tenants, a first connection request to a first server of the plurality of servers;
        identifying the tenant from the multiple tenants based on the first connection request;
        obtaining management rules for managing a connection pool of the plurality of connection pools that is configured for use by the identified tenant while continuously monitoring the connection pool, wherein:
            the management rules dictate whether to permit an execution of one or more connection requests from the identified tenant, and
            the management roles are based on at least one of the one or more configuration properties;
        determining whether the management rules permit execution of the first connection request;

when the management rules permit execution of the first connection request, executing the first connection request;

when the management rules do not permit execution of the first connection request, throttling the first connection request;

determining a first number of connections in the connection pool configured for use by the identified tenant that are in a blocked state; and based on the determined first number of connections that are in the blocked state exceeding a first threshold, re-initializing the connection pool configured for use by the identified tenant.

2. The computer-implemented method of claim 1, wherein:

the identified tenant is a first tenant of the multiple tenants, the obtained management rules comprise first management rules, and the method further comprises:

at the multi-tenancy connection manager:

obtaining second management rules for managing a connection pool of the plurality of connection pools that is configured for use by a second tenant of the multiple tenants, the second management rules being at least partially different from the first management rules; and managing connections for the second tenant in accordance with the second management rules.

3. The method of claim 1, wherein one or more of the obtained management rules are dependent on information received from the identified tenant.

4. The computer-implemented method of claim 1, wherein:

the plurality of servers comprise a plurality of back-end servers, and the connection pool configured for use by the identified tenant comprises connections between one or more application servers and the plurality of back-end servers.

5. The computer-implemented method of claim 1, wherein configuring the plurality of connection pools comprises obtaining, for each connection pool of the plurality of connection pools, the one or more configuration properties of the connection pool.

6. The computer-implemented method of claim 5, further comprising, at the multi-tenancy connection manager, modifying the one or more configuration properties of the connection pool configured for use by the identified tenant based on determining the management rules permit or do not permit the execution of the first connection request.

7. The computer-implemented method of claim 1, wherein the one or more configuration properties configured for each connection pool comprises default configuration properties.

8. The computer-implemented method of claim 5, wherein obtaining, for each connection pool of the plurality of connection pools, the one or more configuration properties comprises, for each connection pool, receiving an indication of the one or more configuration properties from a tenant associated with the respective connection pool.

9. The computer-implemented method of claim 5, wherein the one or more configuration properties further comprise, for each connection pool, one or more of:

a number of connections in the respective connection pool, a number of free connections in the respective connection pool, a number of connections in the respective connection pool that are in a wait state, a number of connections in the respective connection pool that are in a blocked state, a number of connections in the respective connection pool that are in use, an average time that a connection in the respective connection pool is in use, an average time that a connection in the respective connection pool is in the wait state, or an average time that a connection in the respective connection pool is in the blocked state.

10. The computer-implemented method of claim 1, further comprising:

at the multi-tenancy connection manager:

determining a second number of connections in the connection pool configured for use by the identified tenant that are in use; and based on the determined second number of connections that are in use exceeding a second threshold, expanding the connection pool configured for use by the identified tenant.

11. The computer-implemented method of claim 1, wherein the multi-tenancy computing environment comprises a software-as-a-service (SaaS) computing environment.

12. The computer-implemented method of claim 11, wherein the SaaS computing environment is configured to implement a virtual agent.

13. A computer program product comprising a non-transitory computer-readable storage medium having computer-readable instructions stored thereon, the computer-readable instruction being executable by a computerized device to cause the computerized device to perform a method of managing connections to a plurality of servers in a multi-tenancy computing environment, the method comprising:

at a multi-tenancy connection manager responsible for managing connections for multiple tenants of the multi-tenancy computing environment:

configuring a plurality of connection pools, wherein:

each connection pool of the plurality of connection pools is configured for use by a single tenant of the multiple tenants of the multi-tenancy computing environment, each connection pool of the plurality of connection pools comprises connections to the plurality of servers for use by the single tenant, each connection pool is configured with or more configuration properties based on one or more connection requirements of the single tenant associated with each connection pool, and the one or more configuration properties comprise at least one of:

a minimum number of connections to two or more servers of the plurality of servers required for the single tenant in the connection pool; or a maximum number of connections to the two or more servers of the plurality of servers permitted for the single tenant in the connection pool;

storing the one or more configuration properties of each connection pool of the plurality of connection pools in a common connection pool configuration properties register;

receiving, from a tenant of the multiple tenants, a first connection request to a first server of the plurality of servers;

identifying the tenant from the multiple tenants based on the first connection request;

obtaining management rules for managing a connection pool of the plurality of connection pools that is configured for use by the identified tenant while continuously monitoring the connection pool, wherein:

the management rules dictate whether to permit an execution of one or more connection requests from the identified tenant, and the management rules are based on at least one of the one or more configuration properties;

determining whether the management rules permit execution of the first connection request;

when the management rules permit execution of the first connection request, executing the first connection request;

when the management rules do not permit execution of the first connection request, throttling the first connection request;

determining a first number of connections in the connection pool configured for use by the identified tenant that are in a blocked state; and based on the determined first number of connections that are in the blocked state exceeding a first threshold, re-initializing the connection pool configured for use by the identified tenant.

14. An apparatus comprising:

at least one memory comprising computer executable code; and at least one processor configured to execute the computer executable code and cause the apparatus to:

at a tenant-aware connection manager responsible for managing connections for multiple tenants of a multi-tenancy software-as-a-service (SaaS) computing environment:

establish a plurality of connection pools, wherein:

each connection pool of the plurality of connection pools is configured for use by a single tenant of the multiple tenants of the multi-tenancy SaaS computing environment, each connection pool of the plurality of connection pools comprises connections to a plurality of servers for use by the single tenant, each connection pool of the plurality of connection pools is configured with one or more configuration properties based on one or more connection requirements of the single tenant associated with each connection pool, and the one or more configuration properties comprise at least one of:

a minimum number of connections to two or more servers of the plurality of servers required for the single tenant in the connection pool; or a maximum number of connections to the two or more servers of the plurality of servers permitted for the single tenant in the connection pool;

store the one or more configuration properties of each connection pool of the plurality of connection pools in a common connection pool configuration properties register;

receive, from a tenant of the multiple tenants, a first request for one or more connections to the one or more servers;

identify, based on the first request, a connection pool of the plurality of connection pools configured for use by the tenant;

obtain management rules for managing the identified connection pool, wherein:

the management rules dictate whether to permit an execution of one or more connection requests from the identified tenant, and the management it rules are based on at least one of the one or more configuration properties;

determine whether the management rules permit execution of the first request;

when the management rules permit execution of the first request, execute the first request;

when the management rules do not permit execution of the first request, throttle the first request;

determine a first number of connections in the connection pool configured for use by the identified tenant that are in a blocked state; and based on the determined first number of connections that are in the blocked state exceeding a first threshold re-initialize the connection pool configured for use by the identified tenant.

15. The computer program product of claim 13, wherein:

the identified tenant is a first tenant of the multiple tenants, the obtained management rules comprise first management rules, and the method further comprises:

at the multi-tenancy connection manager:

obtaining second management rules for managing a connection pool of the plurality of connection pools that is configured for use by a second tenant of the multiple tenants, the second management rules being at least partially different from the first management rules; and managing connections for the second tenant in accordance with the second management rules.

16. The computer program product of claim 13, wherein the method further comprises, at the multi-tenancy connection manager, modifying the one or more configuration properties of the connection pool configured for use by the identified tenant based on determining the management rules permit or do not permit the execution of the first connection request.

17. The computer program product of claim 13, wherein the method further comprises:

at the multi-tenancy connection manager:

determining a second number of connections in the connection pool configured for use by the identified tenant that are in use or in a blocked state; and based on the determined second number of connections that are in use exceeding a threshold, expanding the connection pool configured for use by the identified tenant.

18. The apparatus of claim 14, wherein:

the identified tenant is a first tenant of the multiple tenants, the obtained management rules comprise first management rules, and the at least one processor is configured to execute the computer executable code and cause the apparatus to:

at the multi-tenancy connection manager:
  obtain second management rules for managing a connection pool of the plurality of connection pools that is configured for use by a second tenant of the multiple tenants, the second management rules being at least partially different from the first management rules; and
  manage connections for the second tenant in accordance with the second management rules.

19. The apparatus of claim 14, wherein the at least one processor is configured to execute the computer executable code and cause the apparatus to, at the multi-tenancy connection manager, modify the one or more configuration properties of the connection pool configured for use by the identified tenant based on determining the management rules permit or do not permit the execution of the first request.

20. The apparatus of claim 14, wherein the at least one processor is configured to execute the computer executable code and cause the apparatus to:
at the multi-tenancy connection manager:
  determine a second number of connections in the connection pool configured for use by the identified tenant that are in use or in a blocked state; and
  based on the determined second number of connections that are in use exceeding a threshold, expanding the connection pool configured for use by the identified tenant.

\* \* \* \* \*